(12) United States Patent
Lee et al.

(10) Patent No.: US 9,969,871 B2
(45) Date of Patent: May 15, 2018

(54) HETEROPHASIC POLYMER COMPOSITION FOR CABLE INSULATION LAYER, CABLE INSULATION LAYER AND POWER CABLE INCLUDING THE SAME

(71) Applicant: Huinnovation Co., Ltd., Seongnam-si, Gyeonggi-do (KR)

(72) Inventors: Moon Seok Lee, Sejong-si (KR); Dong Kwon Lee, Seongnam-si (KR); Kwang Suck Suh, Seongnam-si (KR); June Ho Lee, Seongnam-si (KR); Yeong Ho Jeong, Chungju-si (KR); Hyoung Ku Kang, Chungju-si (KR)

(73) Assignee: HUINNOVATION CO., LTD., Seongnam-si (KR)

( * ) Notice: Subject to any disclaimer, the term of this patent is extended or adjusted under 35 U.S.C. 154(b) by 5 days.

(21) Appl. No.: 15/223,996

(22) Filed: Jul. 29, 2016

(65) Prior Publication Data

US 2018/0016429 A1    Jan. 18, 2018

(30) Foreign Application Priority Data

Jul. 14, 2016 (KR) ........................ 10-2016-0089042

(51) Int. Cl.
| | |
|---|---|
| *C08L 23/16* | (2006.01) |
| *H01B 3/44* | (2006.01) |
| *C08L 23/04* | (2006.01) |
| *C08L 23/08* | (2006.01) |

(52) U.S. Cl.
CPC ............... *C08L 23/16* (2013.01); *C08L 23/04* (2013.01); *H01B 3/441* (2013.01); *C08L 23/0853* (2013.01); *C08L 23/0869* (2013.01); *C08L 2203/206* (2013.01); *C08L 2205/02* (2013.01); *C08L 2207/02* (2013.01); *C08L 2666/06* (2013.01)

(58) Field of Classification Search
CPC ............... C08L 23/16; C08L 2203/206; C08L 2205/02; C08L 2207/02; H01B 3/441
See application file for complete search history.

(56) References Cited

U.S. PATENT DOCUMENTS

| | | | | |
|---|---|---|---|---|
| 2010/0022715 A1* | 1/2010 | Grein et al. | ............ | C08L 23/04 525/221 |
| 2011/0169199 A1* | 7/2011 | Weng et al. | .......... | B29C 43/003 264/500 |

FOREIGN PATENT DOCUMENTS

KR    10-2014-0134836 A    11/2014

* cited by examiner

*Primary Examiner* — Nathan M Nutter
(74) *Attorney, Agent, or Firm* — Birch, Stewart, Kolasch & Birch, LLP (57) ABSTRACT

Disclosed is a heterophasic polymer composition for environmentally friendly cable insulation layers that exhibits excellent electrical, mechanical, and thermal properties while realizing the flexibility, bendability, and impact resistance performance characteristics of polypropylene. The heterophasic polymer composition for cable insulation layers is configured such that propylene copolymer particles each having a predetermined size are dispersed in a polypropylene matrix.

9 Claims, 4 Drawing Sheets

HETEROPHASIC POLYMER COMPOSITION FOR CABLE INSULATION LAYER, CABLE INSULATION LAYER AND POWER CABLE INCLUDING THE SAME

TECHNICAL FIELD

The present invention relates to a heterophasic polymer composition for environmentally friendly cable insulation layers that exhibits excellent electrical, mechanical, and thermal properties while realizing the flexibility, bendability, and impact resistance performance characteristics of polypropylene, and more particularly to a heterophasic polymer composition for cable insulation layers configured such that propylene copolymer particles each having a predetermined size are dispersed in a polypropylene matrix.

BACKGROUND ART

With the increase in the demand for electric power in the present society, the demand for power cables has increased. As a result, power cables that are capable of transmitting high-capacity electric power have been actively developed.

In general, a power cable includes a conductor and an insulation layer for covering the conductor. A high-voltage or ultrahigh-voltage cable may further include an inner semi-conductive layer interposed between the conductor and the insulation layer, an outer semi-conductive layer for covering the insulation layer, and a sheath layer for covering the outer semi-conductive layer. After being used for a predetermined period of time, the power cable is discarded. That is, the power cable is an article of consumption. A material obtained by cross-linking polyolefin polymers, such as polyethylene, ethylene polyethylene rubber (EPR), and ethylene propylene diene monomer (EPDM), which exhibit excellent mechanical and electrical characteristics, is generally used as a conventional insulation material for the power cable.

For cross-linked polyethylene (XLPE), however, it is not possible to reshape an insulation layer that does not satisfy quality control (QC) standards, such as cross-linkability, after the production of a cable. As a result, the produced insulation layer is discarded. In addition, it is difficult to burn up cables after the use of the cables for the lifetime thereof. That is, the cables are not environmentally friendly. Furthermore, in order to manufacture a cross-linked polyethylene (XLPE) cable, a cross-linking process at a high temperature and a high pressure (for example, about 300° C. and 7 atmospheres) is required after the formation of the cable. To this end, it is essentially required to introduce a curing pipe more than several tens of meters long, with the result that the costs related to a manufacturing factory site and necessary electric power are considerably increased. Furthermore, it is essentially required to add an expensive chemical material (e.g. a cross-linking agent) for cross-linking, with the result that manufacturing costs and resources consumption are increased.

Various attempts have been made in order to solve the above-mentioned problems. For example, Korean Patent Application Publication No. 10-2014-0134836 discloses a composition configured such that propylene copolymer particles are dispersed in a polypropylene matrix, wherein the composition is used as an insulation material. An environmentally friendly polypropylene resin that exhibits high heat resistance without being cross-linked since the melting point of the polymer is 160° C. or higher is used as a matrix, and a propylene copolymer having a predetermined average particle size is dispersed in the polypropylene matrix in order to improve the low flexibility and bendability of the polypropylene resin, which are the drawbacks of the polypropylene resin. The resultant composition is used as an insulation material. The product manufacturing process is completed immediately after the formation of the cables without an additional cross-linking process, with the result that manufacturing costs are considerably reduced. In addition, in the event that a produced cable does not satisfy prescribed standards, the insulation layer may be separated and reshaped, with the result that the produced insulation layer may be reused.

However, the above-mentioned publication does not suggest the possibility of a heterophasic polymer composition for cable insulation layers that exhibits higher electrical characteristics than conventional heterophasic polymer compositions and, in addition, exhibits high dielectric strength at a high temperature or when mechanical force is applied thereto.

In addition, with the increase in the amount of electric power that is used, power cables capable of transmitting high-voltage electricity have been increasingly used, and there is an urgent necessity to improve the properties of polypropylene in order to positively use polypropylene as an environmentally friendly insulation layer that retains its electrical characteristics even at a high temperature. In conclusion, there is a high necessity for a heterophasic polymer composition for cable insulation layers that exhibits further improved AC dielectric breakdown strength, long-term heat resistance, electrical insulation, and mechanical strength while exhibiting flexibility and bendability equal to or higher than those of cross-linked polyethylene (XLPE) such that the cross-linked polyethylene (XLPE) can be replaced with the heterophasic polymer composition.

DISCLOSURE

Technical Problem

Therefore, the present invention has been made to solve the above problems and other technical problems that have yet to be resolved.

As a result of a variety of extensive and intensive studies and experiments to solve the problems described above, the inventors of the present application have found that, in the case in which a heterophasic polymer composition including a polypropylene matrix and a propylene copolymer having a predetermined average particle diameter is used as a cable insulation layer, as will be described hereinafter, the insulation layer exhibits better thermal, electrical, and mechanical characteristics, such as higher long-term heat resistance, AC dielectric breakdown strength, and impact strength, than an insulation layer formed using a conventional polymer including polypropylene and a propylene copolymer introduced into the polypropylene. The present invention has been completed based on these findings.

Technical Solution

In accordance with an aspect of the present invention, the above and other objects can be accomplished by the provision of a heterophasic polymer composition for cable insulation layers including a polypropylene matrix and a propylene copolymer dispersed in the polypropylene matrix, wherein the propylene copolymer has an weight average particle diameter of 0.02 to 0.1 μm.

The heterophasic polymer composition for cable insulation layers according to the present invention is characterized in that, in a heterophasic polymer composition configured such that a propylene copolymer having a predetermined particle size is dispersed in a polypropylene matrix, which is a conventional non cross-linked polymer used as an environmentally friendly insulation material, the composition ratio of the heterophasic polymer composition and the size of the particles of the propylene copolymer are specified. As a result, the heterophasic polymer composition for cable insulation layers according to the present invention exhibits high long-term heat resistance and AC dielectric breakdown strength and excellent mechanical characteristics while exhibiting high impact strength. In the case in which the heterophasic polymer composition according to the present invention is used as a cable insulation layer, therefore, the heterophasic polymer composition may be highly applicable as an environmentally friendly insulation material.

In the heterophasic polymer composition according to the present invention, the polypropylene matrix may be a polymer based on a mixture of monomers further including a monomer in addition to propylene. Specifically, the polypropylene matrix may be composed of homo polypropylene, which is based on a propylene monomer. Here, the homo polypropylene is polypropylene including a minimum of 98% by weight, preferably 99 or more % by weight, and more preferably 99.5% by weight, of a propylene monomer. The polypropylene matrix imparts rigidity and tensile strength to the insulation layer.

Meanwhile, in the case in which the polymer of the polypropylene matrix is a propylene copolymer made from a mixture of monomers including a monomer in addition to propylene, the mixture of monomers of the propylene copolymer may include one or more monomers selected from ethylene and α-olefin having 4 to 8 carbons, i.e. 1-butene, 1-pentene, 4-methyl-1-pentene, 1-hexene, 1-octene.

For example, the mixture of monomers of the propylene copolymer comprises at least one monomer selected from the group consisting of ethylene and α-olefin having 4 to 8 carbons. Specifically, the propylene copolymer may be ethylene propylene rubber (EPR). In some cases, a diene monomer may be further included in the copolymer, and the copolymer may be ethylene propylene diene monomer (EPDM) rubber. As the result of copolymerization of propylene and ethylene, the resultant copolymer may exhibit both rigid and flexible properties whereby the impact strength of the copolymer may be further improved.

For general ethylene propylene rubber, the weight ratio of ethylene to propylene may be 2:8 to 7:3. If the weight ratio of ethylene to propylene is less than 2:8, the flexibility, bendability, impact resistance, and cold resistance of the insulation layer may be insufficient. On the other hand, if the weight ratio of ethylene to propylene is greater than 7:3, the heat resistance and mechanical strength of the insulation layer may be insufficient. Specifically, the ethylene propylene rubber may be configured such that the weight ratio of ethylene to propylene is 4:6 to 6:4. More specifically, the two monomers, i.e. ethylene and propylene, may be added such that the weight ratio of ethylene to propylene is 5:5.

In a preferred example, the propylene copolymer may be 15 to 30% by weight relative to the total weight of the heterophasic polymer composition. If the propylene copolymer is less than 15% by weight relative to the total weight of the heterophasic polymer composition, the flexibility, bendability, impact resistance, and cold resistance of the insulation layer may be insufficient. Specifically, the propylene copolymer may be 20 to 25% by weight relative to the total weight of the heterophasic polymer composition.

In the heterophasic polymer composition according to the present invention, the propylene copolymer particles are dispersed in the polypropylene matrix, as previously described. The propylene copolymer particles may have an average particle diameter of 0.02 to 0.1 μm.

Conventionally, heterophasic polymer compositions configured such that propylene copolymer particles having an average particle size of about 1 μm or less are dispersed in a polypropylene matrix have generally been proposed. In reality, however, propylene copolymer particles having an average particle size of 0.5 μm to 0.9 μm have been used.

The inventors of the present application have found that, in the case in which propylene copolymer particles having an average particle size of less than 0.1 μm are used, the heterophasic polymer composition for cable insulation layers according to the present invention exhibits high impact strength and dielectric strength and retains the dielectric strength regardless of any change in temperature or pressure.

Specifically, the inventors of the present application have found that, in the case in which the heterophasic polymer composition is configured such that a propylene copolymer having an average particle diameter of 0.02 to 0.1 μm is dispersed in a polypropylene matrix, the heterophasic polymer composition exhibits high AC dielectric strength and long-term heat resistance even at high temperatures while exhibiting higher electrical insulation than a conventional heterophasic polymer composition, and maintains uniform AC dielectric strength regardless of a pressure change, as can be seen from the following description with reference to experimental results. Consequently, it is possible to provide a heterophasic polymer composition for environmentally friendly cable insulation layers, which is readily applicable to high-voltage power cables, as an environmentally friendly insulation material in place of cross-linked polyethylene (XLPE).

The experiments carried out by the inventors of the present application show that, if the average particle diameter of the propylene copolymer exceeds 0.1 μm, it is difficult to exhibit the critical effects related to the above-specified properties. On the other hand, the experiments carried out by the inventors of the present application show that it is very difficult to manufacture a polymer composition configured such that propylene copolymer particles having an average particle diameter of less than 0.02 μm, e.g. 0.01 μm or less, are dispersed in a polypropylene matrix at the present technology level and that the cost of manufacturing the polymer composition is very high, thereby being meaningless.

In a preferred example, the propylene copolymer particles may have an average particle diameter of 0.03 to 0.07 μm, preferably 0.05 to 0.06 μm, and more preferably 0.05 μm.

In the present invention, the polypropylene matrix and propylene copolymer may be manufactured using methods that are generally used in the field of polymers. One example of the manufacturing methods is disposed in Korean Patent Application Publication N. 2014-0134836.

The size of the particles of the propylene copolymer in the polypropylene matrix may be measured using an appropriate microscope in the state in which the propylene copolymer is etched using an organic solvent, such as xylene. For example, the size of the particles of the propylene copolymer may be measured using an atomic force microscope (AFM), a scanning electron microscope (SEM), or a transmission electron microscope (TEM). Examples of the measurement of the size of the particles of the propylene copolymer and the calculation of the average particle diameter of the propylene copolymer may be found in related documents. For example, an appropriate method of measuring the size of the propylene copolymer particles in a sample stained by $RuO_4$ using a scanning electron microscope (SEM) is disclosed in Poelt et al. J. Appl. Polym. Sci. 78 (2000) 1152-61. In the present invention, the scanning electron microscope (SEM) is used to measure the average particle diameter of the polymer particles.

Specifically, in order to verify the excellent electrical characteristics of the heterophasic polymer composition according to the present invention, the AC dielectric breakdown voltage of the heterophasic polymer composition was measured at a temperature of 293K and a pressure of 0.1 MPa. In addition, in order to verify the mechanical characteristics of the heterophasic polymer composition according to the present invention, the AC dielectric breakdown voltage of the heterophasic polymer composition was measured at a uniform temperature of 293K while changing the pressure. Furthermore, in order to verify the thermal characteristics of the heterophasic polymer composition according to the present invention, the AC dielectric breakdown voltage of the heterophasic polymer composition was measured at a uniform pressure of 0.1 MPa while changing the temperature.

In order to analyze the AC dielectric breakdown characteristics, the distribution of the electric field of each sample located between electrodes was analyzed through simulation using a finite element method (FEM).

In accordance with another aspect of the present invention, there is provided a cable insulation layer including the heterophasic polymer composition. In accordance with a further aspect of the present invention, there is provided a power cable including the cable insulation layer.

The heterophasic polymer composition may be equal to or greater than 15% by weight relative to the total weight of the cable insulation layer. If the heterophasic polymer composition is less than 15% by weight relative to the total weight of the cable insulation layer, the effects of the present invention may not be achieved. Specifically, the heterophasic polymer composition may be equal to or greater than 20% by weight relative to the total weight of the cable insulation layer. More specifically, the heterophasic polymer composition may be equal to or greater than 25% by weight relative to the total weight of the cable insulation layer.

The kinds of polymers that may be included in the cable insulation layer in addition to the heterophasic polymer composition are not particularly restricted as long as the cable insulation layer exhibits thermal, electrical, and mechanical characteristics while being environmentally friendly, recycled, and reshaped. For example, the polymer that may be included in the cable insulation layer may be the same as the polymer used in the polypropylene matrix according to the present invention. Alternatively, the polymer that may be included in the cable insulation layer may be different from the polymer used in the polypropylene matrix according to the present invention.

In a concrete example, the polymer that may be included in the cable insulation layer may be a thermoplastic polymer such as polyethylene. It is possible to change the mechanical characteristics of the cable insulation layer by adding polyethylene. For example, polyethylene may be appropriately added in order to further improve impact strength, ductility, and resistance to stress whitening (or blushing).

In some cases, the heterophasic polymer composition may further include one or more kinds of additives selected from the group consisting of insulating oil, an antioxidant, an impact modifier, a heat stabilizer, a nucleating agent, and an acid scavenger.

In general, a power cable includes a conductor and an insulation layer for covering the conductor. A high-voltage or ultrahigh-voltage cable may further include an inner semi-conductive layer interposed between the conductor and the insulation layer, an outer semi-conductive layer for covering the insulation layer, and a sheath layer for covering the outer semi-conductive layer. It is possible to provide an insulation layer including the heterophasic polymer composition according to the present invention as an insulation material. In addition, it is possible to provide a power cable including the insulation layer.

BRIEF DESCRIPTION OF THE DRAWINGS

The above and other objects, features and other advantages of the present invention will be more clearly understood from the following detailed description taken in conjunction with the accompanying drawings, in which.

MODE FOR INVENTION

Hereinafter, the present invention will be described with reference to the following example. However, the example is provided only for illustration of the present invention and should not be construed as limiting the scope of the present invention.

EXAMPLE 1

In a reaction chamber having one or more gas phases, a homo polypropylene matrix was produced, and then ethylene propylene rubber (EPR) having a weight ratio of gaseous ethylene to polypropylene of 5:5 and an average particle diameter of 0.05 μm was produced. A sample having a thickness of 250 μm (having an error range of about 25 μm) and an area of 50×50 mm was manufactured from the manufactured heterophasic polymer composition.

COMPARATIVE EXAMPLE 1

A sample was manufactured in the same manner as in Example 1 except that no ethylene propylene rubber was produced.

COMPARATIVE EXAMPLE 2

A sample was manufactured in the same manner as in Example 1 except that a random polypropylene matrix was produced.

COMPARATIVE EXAMPLE 3

An attempt to manufacture a sample was made in the same manner as in Example 1 except that ethylene propylene rubber had an average particle diameter of 0.01 µm. However, no sample was substantially manufactured due to failure of polymerization of ethylene propylene rubber.

COMPARATIVE EXAMPLE 4

A sample was manufactured in the same manner as in Example 1 except that the ethylene propylene rubber had an average particle diameter of 0.5 µm.

COMPARATIVE EXAMPLE 5

A sample was manufactured in the same manner as in Example 1 except that the ethylene propylene rubber had an average particle diameter of 0.8 µm.

Comparative Example 6

A sample of cross-linked polyethylene (XLPE) having the same thickness and size as the respective samples, manufactured as described above, was manufactured.

EXPERIMENTAL EXAMPLE 1

Dielectric constants of the respective samples were measured using an impedance and gain phase analyzer, model 4194A, manufactured by Agilent, having a test frequency range of 10 Hz to 100 MHz. The measured values are shown in Table 2. The dielectric constants of the respective samples were measured by applying an AC voltage of 1 V (60 Hz) to the respective samples at a temperature of 20° C.

EXPERIMENTAL EXAMPLE 2

For each sample, dielectric breakdown tests were carried out 10 times. Based on 8 pieces of data, excluding the minimum value and the maximum value, the dielectric breakdown voltage of each sample, having a dielectric breakdown probability of 63.2%, was calculated using MNITAB, statistical analysis software. The calculated value was named the average dielectric breakdown voltage $V_{BD,63.2\%}$. For the comparison and analysis of dielectric breakdown characteristics, the average dielectric breakdown electric field was calculated using the average electric field, calculated using a finite element method (FEM), and the dielectric breakdown voltage, obtained through the AC dielectric breakdown experiments.

$E_{1kV}$ indicates the average electric field value in the case in which a voltage of 1 kV is applied to the upper electrode and the lower electrode is grounded, and $E_{BD,63.2\%}$ indicates the average dielectric breakdown electric field at a dielectric breakdown probability of 63.2%, specifically the electric field value in the case in which the average dielectric breakdown voltage $V_{BD,63.2\%}$ is applied to the sample, i.e. when dielectric breakdown occurs in the sample. Since $E_{BD,63.2\%}$ has a linear characteristic depending on the value of $V_{BD,63.2\%}$, $E_{BD,63.2\%}$ may be calculated using the electric field analysis value $E_{1kV}$, calculated through simulation ($E_{BD,63.2\%}=E_{1kV}\times V_{BD,63.2\%}$). $V_{BD,63.2\%}$ is a non-dimensional proportionality constant value.

The experiments were carried out using 293K silicone oil at a pressure of 0.1 MPa and according to ASTM D-149. The silicone oil used in the experiments was KF96-100CS, manufactured by Shinetsu.

EXPERIMENTAL EXAMPLE 3

Experiments were carried out in the same manner as in Experimental Example 2 except that the experiments were carried out at pressures of 0.1, 5, 10, and 20 MPa.

EXPERIMENTAL EXAMPLE 4

The elongation at break of each sample over time was observed while each sample was aged at a temperature of 130° C. The time after which the observed elongation at break of each sample became less than 80% of the initial elongation at break of each sample at room temperature was measured.

EXPERIMENTAL EXAMPLE 5

Experiments were carried out for Sample 6 and Sample XLPE in the same manner as in Experimental Example 2 except that the experiments were carried out at temperatures of 20° C., 50° C., 70° C., 90° C., 110° C., and 130° C.

TABLE 1

| Sample | 1 | 2 | 3 | 4 | 5 | 6 |
|---|---|---|---|---|---|---|
| Kind | Comparative Example 1 | Comparative Example 2 | Comparative Example 3 | Comparative Example 4 | Comparative Example 5 | Example 1 |
| Density (g/cm³) | 0.9 | 0.9 | NA | 0.9 | 0.9 | 0.9 |
| Melt flow rate (g/min) | 2 | 1.2 | NA | — | 3 | 3 |
| Tensile strength (kg/cm²) | 370 | 320 | NA | — | 270 | 205 |
| Flexural strength (kg/cm²) | 15000 | 14000 | NA | — | 12000 | 7400 |
| Elongation at break (%) | >500 | >500 | NA | — | >500 | 890 |

TABLE 1-continued

| Sample | 1 | 2 | 3 | 4 | 5 | 6 |
|---|---|---|---|---|---|---|
| Melting point (° C.) | 163 | 133 | NA | 160 | 145-160 | 145-160 |
| Izod impact strength (kg · cm) | 5 | 9.5 | NA | — | 16 | 68 |

TABLE 2

| Sample | 1 | 2 | 3 | 4 | 5 | 6 |
|---|---|---|---|---|---|---|
| Dielectric constant | 1.81 | 2.04 | NA | — | 2.37 | 2.14 |
| $V_{BD,\,63.2\%}$ [kV] | 31.68 | 32.68 | NA | — | 28.29 | 33.94 |

TABLE 3

| Sample | 1 | 2 | 3 | 4 | 5 | 6 | XLPE |
|---|---|---|---|---|---|---|---|
| Time after which less than 80% of elongation at break (hour) | 361 | 696 | NA | — | 2374 | 3382 | 1237 |
| 22 kV long-term life | 97 | 231 | NA | — | 768 | 1032 | 116 |

Table 1 shows the melt flow rate, the tensile strength, the flexural strength, the elongation at break, the melting point, and the Izod impact strength of each sample.

Table 2 shows the dielectric constant of each sample and the AC dielectric breakdown voltage of each sample, measured at a pressure of 0.1 MPa and a temperature of 293 K.

Table 3 shows, after each sample was aged at a temperature of 130° C., the time after which the elongation at break of each sample became less than 80% of the elongation at break of each sample at room temperature.

As can be seen from the above, Sample 6 (Example 1) exhibits higher elongation at break and impact strength than the comparative examples, and has a lower dielectric constant value than Sample 5 (Comparative Example 5). In addition, Sample 6 (Example 1) has a higher dielectric breakdown voltage than the other samples, thereby exhibiting higher dielectric strength than the other samples.

When describing in greater detail the results shown in Table 3, after each sample was aged at a temperature of 130° C., the time after which the elongation at break of each sample became less than 80% of the initial elongation at break of each sample at room temperature was measured, as previously described. If the elongation at break of each sample becomes less than 80% of the initial elongation at break of each sample, the electrical and physical properties of the cable are drastically lowered. For this reason, the time after which the elongation at break of a cable becomes less than 80% of the initial elongation at break of the cable is considered very important in some IEC standards. In the case in which the time taken for the elongation at break of the cable to decrease below 80% of the initial elongation at break of the cable is longer, it is considered that the cable exhibits higher long-term heat resistance, which is directly related to the lifespan of the cable. In the case in which the cable includes a heterophasic polymer composition according to the present invention, it is expected that the lifespan of the cable will be increased. As a result, it is expected that the loss of social and economic costs due to frequent replacement of the cable will be reduced.

As can be seen from Table 3, the time taken for the elongation at break of Sample 6 (Example 1) to become less than 80% of the initial elongation at break of Sample 6 (Example 1) is longer than the time taken for the elongation at break of each of the other samples to become less than 80% of the initial elongation at break of each of the other samples. In particular, the time taken for the elongation at break of Sample 6 (Example 1) to become less than 80% of the initial elongation at break of Sample 6 (Example 1) is 1.5 times of the amount of the time taken for the elongation at break of Sample 5 (Comparative Example 5) to become less than 80% of the initial elongation at break of Sample 5 (Comparative Example 5). That is, Example 1 exhibits the highest long-term heat resistance.

Figure 1:
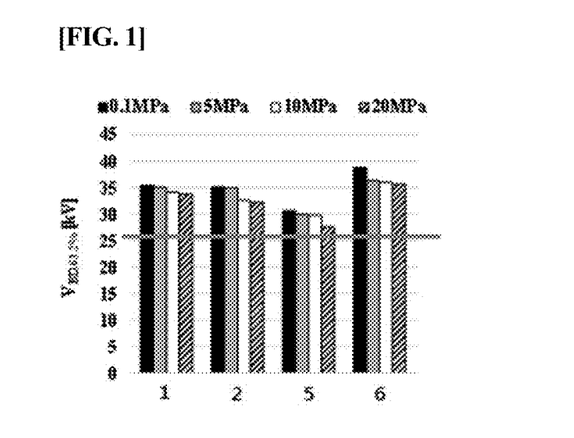
FIG. 1 is a graph showing AC dielectric breakdown voltage ($V_{BD,63.2\%}$) for each sample in consideration of a thickness reduction depending on pressure change.
Figure 2:
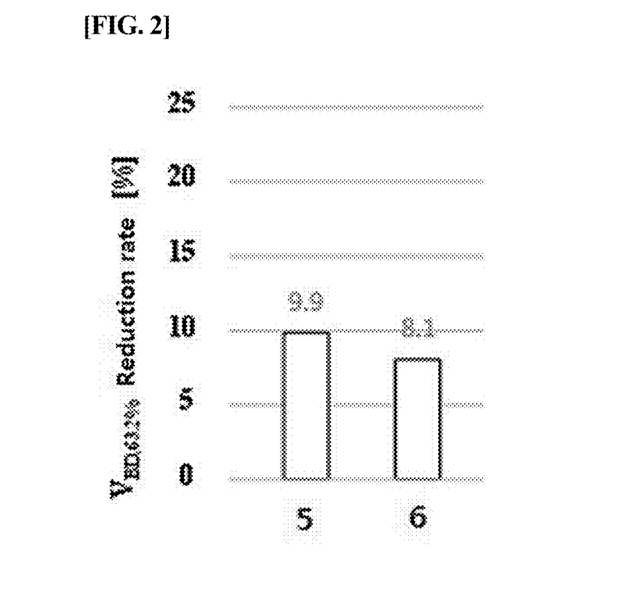
FIG. 2 is a graph showing the reduction rates of AC dielectric breakdown voltage of Sample 5 and Sample 6 depending on the pressure change.
Figure 3:
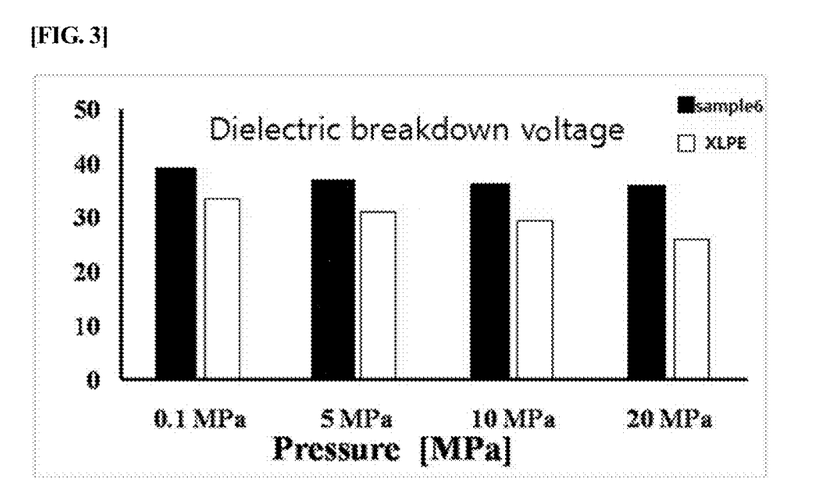
FIG. 3 is a graph showing the dielectric breakdown voltage values of Sample 6 and cross-linked polyethylene (XLPE) depending on pressure change.
Figure 4:
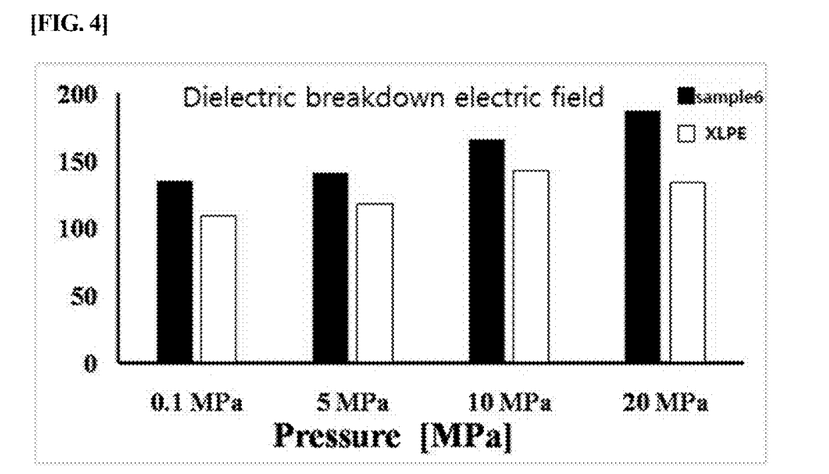
FIG. 4 is a graph showing the dielectric breakdown electric field values of Sample 6 and cross-linked polyethylene (XLPE) depending on pressure change.
Figure 5:
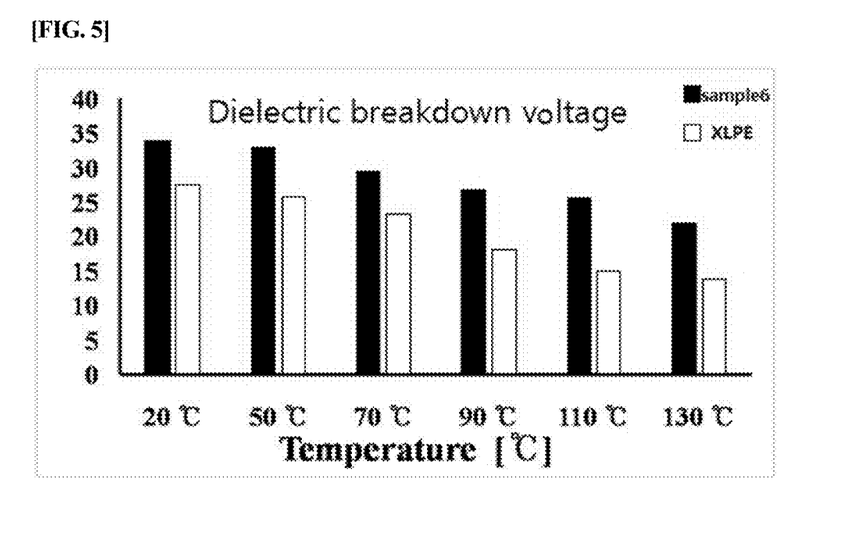
FIG. 5 is a graph showing the dielectric breakdown voltage values of Sample 6 and cross-linked polyethylene (XLPE) depending on temperature change.
Figure 6:
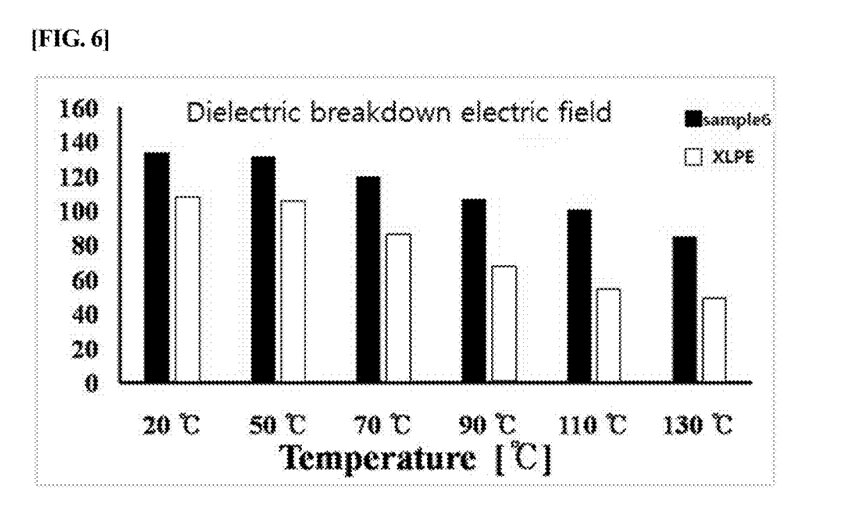
FIG. 6 is a graph showing the dielectric breakdown electric field values of Sample 6 and cross-linked polyethylene (XLPE) depending on temperature change.
Figure 7:
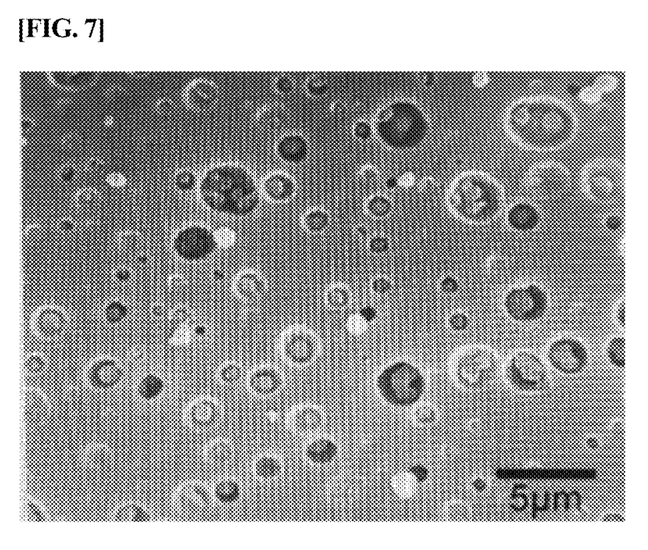
FIG. 7 is an image of scanning electron micrograph (SEM) of Sample 5.
Figure 8:
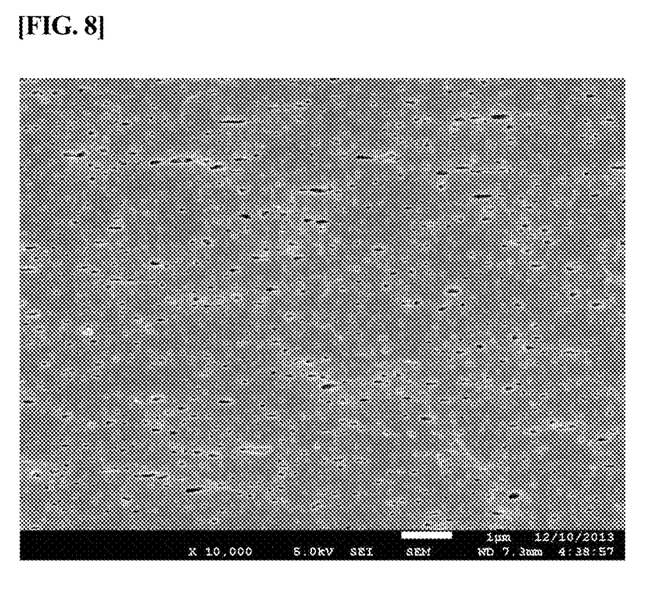
FIG. 8 is an image of scanning electron micrograph (SEM) of Sample 6.

FIG. 1 shows the comparison among AC dielectric breakdown voltages $V_{BD,63.2\%}$ of the samples depending on pressure change. FIG. 2 shows the reduction rates of AC dielectric breakdown voltage of Sample 5 (Comparative Example 5) and Sample 6 (Example 1) depending on the pressure change. When a micrometer head installed in an electrode system was adjusted to increase the mechanical force of an upper cylinder type electrode applied to the samples, the thicknesses of the samples were reduced depending upon the magnitude of the force. At this time, the reduced thicknesses of the samples are different from one another. Consequently, the AC dielectric breakdown voltages of the samples were compared by referring to the reduction in thickness of the samples depending on pressure change.

As shown in the figures, Sample 6 (Example 1) had the highest AC dielectric breakdown voltage value $V_{BD,63.2\%}$ at any pressure, whereby Sample 6 (Example 1) was evaluated as exhibiting the best mechanical characteristics. In particular, Sample 6 (Example 1) had much higher AC dielectric breakdown voltage value than Sample 5 (Comparative Example 5). Consequently, Sample 6 (Example 1) was evaluated as exhibiting better mechanical characteristics than a heterophasic polymer composition configured such that propylene copolymer particles having an average particle diameter of 0.5 to 1 µm are dispersed in a polypropylene matrix.

FIGS. 3 to 6 show the comparison in AC dielectric breakdown voltage value $V_{BD,63.2\%}$ [kV] and dielectric breakdown electric field value $E_{BD,63.2\%}$ [kV] between Sample 6 and cross-linked polyethylene (XLPE) depending on pressure change and temperature change. In addition, Table 3 shows the reduction time of elongation at break of Sample 6 and the cross-linked polyethylene (XLPE). As can be seen from the above results, Sample 6 (Example 1) exhibits higher heat resistance and better mechanical characteristics than the cross-linked polyethylene (XLPE). In addition, as can be seen from Table 3, the time taken for the elongation at break of Sample 6 (Example 1) to become less than 80% of the initial elongation at break of Sample 6 (Example 1) is about 3 times of the amount of time taken for the elongation at break of the cross-linked polyethylene (XLPE) to become less than 80% of the initial elongation at break of the cross-linked polyethylene (XLPE). That is, Sample 6 (Example 1) exhibits all the characteristic of an excellent cable having a long lifespan.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, a heterophasic polymer composition according to the present invention is configured such that a propylene copolymer having a predetermined average particle diameter is uniformly dispersed in a polypropylene matrix. Consequently, the heterophasic polymer composition according to the present invention exhibits high impact strength, long-term heat resistance, and electrical insulation. Furthermore, the heterophasic polymer composition according to the present invention exhibits high electrical insulation regardless of pressure change. As a result, the heterophasic polymer composition according to the present invention may be used to manufacture an environmentally friendly cable insulation layer. In addition, the heterophasic polymer composition according to the present invention solves problems, such as poor properties, caused in a conventional cable insulation layer. Furthermore, the cable insulation layer is stably used at high temperature. Besides, the heterophasic polymer composition according to the present invention exhibits higher heat resistance and mechanical strength than cross-linked polyethylene (XLPE) while exhibiting basic characteristics, such as flexibility and bendability, equal to or better than cross-linked polyethylene (XLPE).

The invention claimed is:

1. A heterophasic polymer composition for cable insulation layers consisting of a polypropylene matrix and a propylene copolymer dispersed in the polypropylene matrix, wherein the propylene copolymer has an average particle diameter of 0.01 to 0.1 µm, and the propylene copolymer is a copolymer of propylene and at least one monomer selected from a group consisting of ethylene and α-olefin having 4 to 8 carbons.

2. The heterophasic polymer composition according to claim 1, wherein the polypropylene matrix is a homo polypropylene matrix.

3. The heterophasic polymer composition according to claim 1, wherein the propylene copolymer is 15 to 30% by weight relative to a total weight of the heterophasic polymer composition.

4. The heterophasic polymer composition according to claim 1, wherein the propylene copolymer is ethylene propylene rubber (EPR).

5. The heterophasic polymer composition according to claim 4, wherein a comonomer weight ratio of ethylene to propylene in the ethylene propylene rubber is 4:6 to 6:4.

6. The heterophasic polymer composition according to claim 1, wherein the propylene copolymer has an average particle diameter of 0.03 to 0.07 µm.

7. A cable insulation layer comprising the heterophasic polymer composition for cable insulation layers according to claim 1.

8. The cable insulation layer according to claim 7, wherein the heterophasic polymer composition is equal to or greater than 15% by weight relative to a total weight of the cable insulation layer.

9. A power cable comprising the cable insulation layer according to claim 7.

* * * * *